United States Patent [19]

Chornet et al.

[11] 4,113,651
[45] Sep. 12, 1978

[54] MANUFACTURE OF A METAL IMPREGNATED CARBON FROM PEAT MATERIAL

[75] Inventors: Esteban Chornet, Sherbrooke, Canada; Jean-Claude Cavalier, Biarritz, France

[73] Assignee: Universite de Sherbrooke, Canada

[21] Appl. No.: 811,438

[22] Filed: Jun. 29, 1977

[30] Foreign Application Priority Data

May 18, 1977 [CA] Canada .................................. 278700

[51] Int. Cl.$^2$ ...................... B01J 21/18; C01B 31/12; B01J 37/02
[52] U.S. Cl. ..................................... 252/422; 252/447
[58] Field of Search ............... 252/447, 422, 421, 445, 252/444

[56] References Cited

U.S. PATENT DOCUMENTS

| | | | |
|---|---|---|---|
| 1,060,673 | 5/1913 | Ellis | 252/447 |
| 1,559,054 | 10/1925 | Smith | 252/422 |
| 1,768,963 | 7/1930 | Odell et al. | 252/421 |
| 1,812,230 | 6/1931 | Aarts | 252/447 |
| 1,876,009 | 9/1932 | Krauch et al. | 208/113 |
| 2,285,277 | 6/1943 | Henke et al. | 252/447 |
| 2,358,359 | 9/1944 | Stuart | 252/421 |
| 2,481,300 | 9/1949 | Engel | 208/208 |
| 2,881,131 | 4/1959 | Kearby | 208/138 |
| 2,930,765 | 3/1960 | Cooper | 252/473 |
| 3,055,840 | 9/1963 | Koch | 252/443 |
| 3,138,560 | 6/1964 | Keith | 252/447 |
| 3,617,505 | 11/1971 | Cole et al. | 252/445 |
| 3,736,266 | 5/1973 | Schrage | 252/447 |
| 3,804,779 | 4/1974 | Kent | 252/447 |
| 4,045,368 | 8/1977 | Katori et al. | 252/422 |

FOREIGN PATENT DOCUMENTS

449,603  6/1936  United Kingdom ..................... 252/447

*Primary Examiner*—P. E. Konopka
*Attorney, Agent, or Firm*—Cushman, Darby & Cushman

[57] ABSTRACT

There is provided a novel process for preparing a carbon supported metal catalyst which comprises impregnating a peat material selected from finely divided peat, ammoniated peat and humic materials derived from peat with an aqueous solution of a metallic salt, drying the impregnated peat and pyrolyzing same in an inert atmosphere to yield a carbon supported metal and/or metal oxide.

5 Claims, No Drawings

MANUFACTURE OF A METAL IMPREGNATED CARBON FROM PEAT MATERIAL

The present invention relates to a method for preparing a metal impregnated carbon from peat.

PRIOR ART

Three different methods have been generally used for the preparation of metal supported carbon catalysts:

In liquid phase impregnation, finely ground carbon or activated carbon is mixed with a solution containing the impregnating metal salt. This step is followed by filtration and drying. The method has the disadvantage of poor impregnation of the micropore surfaces. High internal surface area carbons cannot then be used, the method being nevertheless universal for high external surfaces area carbon blacks.

In vapor phase impregnation, the carbon particles are contacted with the vapor of a volatile salt of the metal. In this way the micropores can be reached and high metal loadings (about 10% wt) are achieved. The method is limited to metals which can form volatile salts, thus becoming a rather expensive way of preparation.

A third method consists of loading suitable synthetic resins having ion-exchange properties via liquid phase exchange. Filtration and drying are followed by high temperature carbonization of the mixture (500°-800° C.). Highly dispersed metals are thus prepared with metal loadings as high as 12.2% wt. The main disadvantage of the method lies on the initial cost of the synthetic resins normally used in this preparation.

SUMMARY OF THE INVENTION

In accordance with the present invention there is provided method for preparing a metal supported carbon catalyst which comprises impregnating a peat material selected from finely divided peat, ammoniated peat and humic materials derived from peat with an aqueous solution of a metallic salt, reducing the water content of the impregnated peat material and pyrolyzing same to yield a metal and/or metal oxide supported on carbon. If desired the metal supported carbon can be activated to yield a metal supported activated carbon. The metal and/or metal oxide supported carbon can be pelletized before or after activation. Alternatively, the impregnated peat material can be mixed with a binder and extruded in the form of pellets before pyrolyzing.

ADVANTAGES

One of the important features of the present invention is that a metal and/or metal oxide supported carbon catalyst substantially free of sulfur is obtained in opposition to prior art carbon catalysts which contain high amounts of sulfur which are usually present in the original meterial from which activated carbon is made. It should be appreciated the peat material used in accordance with the present invention has a low sulfur content which rarely exceeds 0.2% dry weight basis and thus a substantially sulfur free catalyst is obtained.

The method of the present invention is simple and economical since only one pyrolysis and only one activation step is required in opposition to those methods of the prior art where these steps have already been performed on the starting charcoal or activated charcoal and which are usually repeated after their impregnation with an aqueous metal salt solution.

The novel method of the present invention also provides versatility in the wide range of metals and amounts of each metal which can be supported because of the presence of reactive sites of the humic acids present in the starting peat material in opposition to carbon or activated carbon used in the prior art where the concentration of reactive sites is difficult to control because of the substantial absence of any reactive sites.

Finally, the method of the present invention appears to allow the physical characteristics of certain deposited metals such as platinum to be controlled as to their crystallite size which seem to be a problem with most known platinum carbon catalyst particularly when prepared by the vapor phase impregnation process.

PEAT MATERIAL

The term "peat" used herein is intended to cover peat which is the layer found below the layer of peat moss in a peat bog and normally has an ash content of less than 2% on a dry weight basis. The term peat material is intended to include peat, ammoniated peat and humic acids derived from peat.

Ammoniated peat is obtained by first drying peat on the field to a moisture content of about 35% by weight. Subsequently, the moisture content is reduced to 10-15% by weight by further drying in a storage room and then the peat is ammoniated with $NH_3$ either in batches or in a fluidized bed at a temperature of between 50° or 80° C. in presence of air or inert gas or mixtures thereof.

The humic acids contained in peat are obtained by extraction with a 4% sodium hydroxide solution. The extract is acidified with hydrochloric acid thereby to cause a floc to precipitate. The floc containing the humic acids is recovered by filitration and dried.

The particle size of the peat material is preferably between the range of from 42 to 60 U.S. Tyler mesh.

Peat material is available in various degrees of humification which is measured for example by the humic acid content. The humic acid content is a measure of the degree of humification (degree of decomposition of organic matter in the peat) of the starting peat and since the reaction with the metal salts is in a large extent due to the reactive sites of the humic acid it should be appreciated that other factors will intervene for optimum results. A weakly humified peat is one normally containing from 20 to 30% by weight of humic acid and a large amount of cellulose and lignin, while a well humified peat is one where the humic acid is usually in excess of 60% by weight with a lower content of cellulose and lignin. Accordingly peat with a high humic acid content might require slightly different conditions than those indicated herein for a low humic acid content.

METAL CATALYST

The metals which can be supported on carbon in accordance with the present invention are those which are available in water soluble salt form. As an example of such metals there may be mentioned platinum, ruthenium, chromium manganese, molybdenum, vanadium, iron, nickel, copper and the like which may be desirable as a catalyst for any specific purpose. There is no restriction as to the metals available, provided that one of the salts of the selected metals in relatively water-soluble. The more soluble the metal salt is the more metal can eventually be deposited on the carbon.

IMPREGNATION OF PEAT MATERIAL

Impregnation of the peat material is carried out by stirring the peat material with an aqueous solution of the metallic salt. Usually the ratio of peat/liquid is about 1:20 (gr/cc). The amount of metal salt which can be impregnated is determined by the equilibrium conditions applicable to each metal/peat system and is determined easily by drawing an adsorption or ion-exchange isotherm as is well known to one skilled in the art. Once the isotherm has been established a choice can then be made as to how much metal is to be used per weight of peat and consequently how much metal will eventually be supported on the carbon.

The pH of the metal solution during impregnation is not critical, but better results can be obtained when the pH of the metal solution is made less acid keeping in mind that the acidity cannot be reduced to a point where precipitation of the impregnating metal salt will occur.

The stirring of the peat material and the aqueous solution of the selected metal salt is preferably carried out 'in vacuo' in order to eliminate any occluded air thus facilitating penetration of the metal salt inside the pores of the peat material where most of the reactive sites are found.

The impregnated peat is then dried at about 105° C. for a period of about 48 hours before proceeding to the pyrolysis or carbonization step.

PYROLYSIS OR CARBONIZATION

The carbonization step, also referred to as controlled pyrolysis is carried out in an appropriate furnace at a temperature range of from 500° to 800° C. with a preferred range of from 500° to 600° C. in an inert atmosphere. The inert atmosphere can be provided either by supplying an inert gas such as nitrogen to the pyrolysis chamber or the inert atmosphere can be built up 'in situ' by the pyrolysis gases. Nitrogen is supplied to the system at an appropriate flow rate. For example, about 981 cc/min can be used for a linear velocity of about 103 cc/min. The impregnated peat material is fed into the oven so that the temperature profile increases regularly at a rate of about 10° C./min up to the selected carbonization temperature which is usually maintained for about 30 minutes.

Depending on the type of metal supported carbon catalyst desired, the dried impregnated peat can be converted to a metal supported carbon by controlled pyrolysis or carbonization and, if desired, the metal supported carbon could be converted to a metal supported activated carbon by further activation as is well known in the art. Alternatively, both the carbonization and activation steps can be carried out in the same reactor.

The yield of carbonization is determined by using the amount of impregnated peat material before carbonization and of impregnated coke after carbonization. The amount of metal or metal oxide on the coke can be accurately determined by digestion and analysis by atomic absorption spectrometry.

EXAMPLE 1

A water solution of chloroplatinic acid (having a Pt concentration of 1409 mg of Pt/l of solution) is prepared by adding 3.73 g. of $H_2PtCl_6.2H_2O$ to 1000 c.c. of water. The pH of the resulting solution is 1.75.

Peat samples containing about 10% moisture are finely ground and sieved (42/60 U.S. Tyler mesh). 22 g. of the peat powder thus obtained are mixed at room temperature with 400 c.c. of the platinum solution above described. No pH adjustment is made in this preparation. Stirring of the slurry is carried out under vacuum to eliminate occluded air. Once the evolution of bubbles has ended the slurry is filtered out also under vacuum conditions. The yellow liquid solution which results from this operation is analyzed by atomic absorption spectrophotometry in order to determine the residual concentration of metal ions.

The filtered residue is dried in oven at 105° C. for a period of 48 hrs. A small fraction of the resulting peat is digested in a hot concentrated acid solution in order to determine its metal content. The remaining impregnated material is put into a displaceable holder and carbonized in a 3 inch diameter laboratory furnace at 540° C. for 30 min. under a nitrogen atmosphere (flow rate = 103 cm/min). The temperature profile is such that the heating rate is of approximately 10° C./min up to the hold temperature of 540° C.

Measurments of the surface area pore volume and platinum dispersion can be carried out following established procedures.

The results are shown in Table 1.

TABLE 1

| IMPREGNATION OF SPHAGNUM PEAT WITH PLATINUM | |
|---|---|
| Impregnating salt | $H_2PtCl_2.2H_2O$ |
| pH of salt solution | 1.75 |
| pH adjustment | none |
| Metal ion concentration in liquid (ppm) | 1274.0 |
| Metal concentration mg. metal/g peat | 2.7 |
| Moles of metal/g peat ($\times 10^4$) | 0.14 |
| moles of metal/g coke ($\times 10^4$) | 0.42 |
| Metal concentration mg. metal/g coke | 8.1 |

EXAMPLES 2-10

In a manner similar to the one described for Example 1, impregnation with other metals was also tried from solutions of different metal salts at varying concentrations as determined from isotherms. Other compounds could also be used since the procedure is not limited in any way to the metals and salts listed. In Example 3-10 the pH was adjusted where indicated with hydrochloric acid.

The results after carbonization at 540° C. are shown in Table 2.

TABLE 2

| | | | | | | | | | |
|---|---|---|---|---|---|---|---|---|---|
| | | | IMPREGNATION OF SPHAGNUM PEAT WITH METAL IONS | | | | | | |
| Ex. | Metal ion | Impregnating salt | pH of metal salt solution | pH adjusted | Metal ion equlibrium concentration in liquid (ppm) | Metal concentration mg. metal/g of peat (m.a.f.) | Moles of metal/g of peat (m.a.f.) ($\times 10^4$) | Moles of metal/g of coke ($\times 10^4$) | Metal concentration mg. metal/g of coke |
| 2 | $Rh^{3+}$ | $RhCl_3.4H_2O$ | 2.30 | none | 1700 | 9.9 | 0.97 | 3.23 | 32.9 |
| 3 | $Cr^{3+}$ | $Cr(NO_3)_3.9H_2O$ | 2.80 | 4.10 | 1450 | 15.0 | 2.88 | 9.60 | 50.0 |

TABLE 2-continued
IMPREGNATION OF SPHAGNUM PEAT WITH METAL IONS

| Ex. | Metal ion | Impregnating salt | pH of metal salt solution | pH adjusted | Metal ion equlibrium concentration in liquid (ppm) | Metal concentration mg. metal/g of peat (m.a.f.) | Moles of metal/g of peat (m.a.f.) ($\times 10^4$) | Moles of metal/g of coke ($\times 10^4$) | Metal concentration mg. metal/g of coke |
|---|---|---|---|---|---|---|---|---|---|
| 4 | $Mn^{2+}$ | $MnCl_2 \cdot H_2O$ | 5.30 | 7.20 | 1516 | 16.0 | 2.91 | 9.33 | 51.3 |
| 5 | $Mo^{5+}$ | $MoCl_5$ | 1.40 | none | 550 | 22.0 | 2.29 | 7.63 | 73.3 |
| 6 | $Ru^{3+}$ | $RuCl_3 \cdot 3H_2O$ | 1.80 | none | 1460 | 4.3 | 0.42 | 1.40 | 14.3 |
| 7 | $V^{3+}$ | $VCl_3$ | 1.97 | 3.40 | 1150 | 11.5 | 2.25 | 7.55 | 38.5 |
| 8 | $Fe^{3+}$ | $FeCl_3 \cdot 6H_2O$ | 2.13 | 2.45 | 1120 | 11.4 | 2.04 | 6.02 | 33.6 |
| 9 | $Fe^{2+}$ | $FeSO_4$ | 4.50 | 6.50 | 625 | 5.8 | 1.04 | 3.12 | 17.4 |
| 10 | $Ni^{2+}$ | $Ni(NO_3)_2 \cdot 6H_2O$ | 6.00 | 7.15 | 400 | 5.4 | 0.92 | 3.16 | 18.6 |

EXAMPLES 11-13

Finely ground peat (48/60 U.S. Tyler mesh) and having a moisture content of 10% by weight is contacted with $NH_3$-air-$N_2$ mixtures in a fluidized bed reactor (2½ in. in diameter and 19 in. height provided with stirrer). The ammoniation proceeds exothermally and as a result the bed is heated up to 45° C.

Fluidization conditions are:
  Gas Flow Rate: 30 liters/min.
  Gas composition: 10% $NH_3$, 30% air, 60% $N_2$
  Sold residence time: >30 sec.
  Stirrer speed: 300 rpm The ammoniated material undergoes then the same procedure than the one described in Example 1. Ammoniation results in quite a large increase in the amounts of metal fixed as it is shown in Table 3.

TABLE 3
IMPREGNATION OF AMMONIATED SPHAGNUM PEAT WITH METALS

| Ex. | Metal ion | Impregnating salt | pH of metal salt solution | pH adjusted | Metal ion equlibrium concentration in liquid (ppm) | Metal concentration mg. metal/g of peat (m.a.f.) | Moles of metal/g of peat (m.a.f.) ($\times 10^4$) | Moles of metal/g of coke ($\times 10^4$) | Metal concentration mg. metal/g of coke |
|---|---|---|---|---|---|---|---|---|---|
| 11 | $Fe^{3+}$ | $FeCl_3 \cdot 6H_2O$ | 2.13 | 2.45 | 1120 | 48.6 | 8.7 | 25.7 | 143.4 |
| 12 | $Fe^{2+}$ | $FeSO_4$ | 4.50 | 6.50 | 625 | 48.7 | 8.7 | 26.1 | 146.4 |
| 13 | $Ni^{2+}$ | $Ni(NO_3)_2 \cdot 6H_2O$ | 6.00 | 7.15 | 400 | 50.4 | 8.6 | 29.5 | 173.6 |

It will be observed that starting with ammoniated peat results in a greater ion exchange capacity between the metal salt and the peat which cannot be explained only by the fact that $NH_4$ sites have been incorporated in the form of $COO^- NH_4^{30}$ groups on the reactive sites of the peat. It is believed that ammoniation causes important structural changes in the peat itself, probably due to the fact that the saturation values in the case of ammoniated peat are nearly identical on a molar basis which would not appear to be the case of unsaturated peat, as can be seen in Table IV.

TABLE IV
COMPARISON OF ION EXCHANGE CAPACITY OF UNTREATED AND AMMONIATED PEAT

| Metal Ion | Metal ion equilibrium conc. in liquid p.p.m. | Saturation values (mg ion/g sphagnum peat) | |
|---|---|---|---|
| | | Untreated peat | Ammoniated peat |
| $Fe^{3+}$ | 1120 | 11.4 | 47.5 – 48.6 |
| $Fe^{2+}$ | 625 | 5.8 | 47.2 – 48.7 |
| $Ni^{2+}$ | 400 | 5.4 | 48.3 – 50.4 |

We claim:

1. In a process for preparing a finely divided carbon supported metal catalyst by pyrolyzing a dried metal impregnated ammoniated peat, the improvement which comprises treating dried peat with gaseous ammonia at a temperature of between 45° and 80° C., thereby producing an ammoniated peat characterized by a higher ion exchange capacity than the unammoniated peat, contacting said ammoniated peat with a metal salt solution to produce metal impregnated ammoniated peat having a metal content higher than the normal saturation capacity of unammoniated peat with said metal.

2. A process according to claim 1 wherein the dried peat has a moisture content of 10 to 15%.

3. A process according to claim 1 wherein the pyrolysis is carried out at about 500° to 800° C., in the presence of an inert gas.

4. A process according to claim 3 wherein the dried peat is ammoniated at a temperature of between 50° and 80° C.

5. A process according to claim 3 wherein the peat is ammoniated at 45° C.

* * * * *